United States Patent [19]

Meneghetti

[11] Patent Number: 5,743,491
[45] Date of Patent: Apr. 28, 1998

[54] VERY LARGE AIRCRAFT LANDING GEAR HAVING EIGHT WHEEL TRUCK

[75] Inventor: Michael J. Meneghetti, Renton, Wash.

[73] Assignee: The Boeing Company, Seattle, Wash.

[21] Appl. No.: 352,337

[22] Filed: Dec. 8, 1994

[51] Int. Cl.⁶ .................. B64C 25/22; B64C 25/34; B64C 25/58
[52] U.S. Cl. .................. 244/104 FP; 244/102 A; 244/102 SS; 244/104 R; 244/103
[58] Field of Search .................. 244/100 R, 102 R, 244/102 A, 102 SS, 104 R, 104 FP, 104 CS, 103

[56] References Cited

U.S. PATENT DOCUMENTS

| | | |
|---|---|---|
| 2,487,598 | 11/1949 | Hawkins, Jr. ............. 244/104 FP |
| 2,538,388 | 1/1951 | Sievers . |
| 2,579,180 | 12/1951 | Eldred ............. 244/104 FP |
| 2,851,231 | 9/1958 | Westcott, Jr. . |
| 3,091,416 | 5/1963 | Knights et al. . |
| 3,315,919 | 4/1967 | Perdue ............. 244/102 R |
| 3,904,153 | 9/1975 | Watts . |
| 4,869,444 | 9/1989 | Ralph ............. 244/104 FP |
| 5,110,068 | 5/1992 | Grande et al. . |
| 5,242,131 | 9/1993 | Watts . |
| 5,310,140 | 5/1994 | Veaux et al. ............. 244/104 FR |

FOREIGN PATENT DOCUMENTS 972056  1/1951  France ............. 244/104 FP

*Primary Examiner*—Andres Kashnikow
*Assistant Examiner*—Virna Lissi Mojica
*Attorney, Agent, or Firm*—Conrad O. Gardner

[57] ABSTRACT

Very large aircraft landing gear using single mounted eight wheel bogie on dual shock struts. A primary or main two-stage shock absorber and a semi-articulating secondary or auxiliary single-stage shock absorber, each of which are mounted using the second and third axles as pivot joints in a four axle, eight wheel truck beam.

1 Claim, 4 Drawing Sheets

Fig. 3.
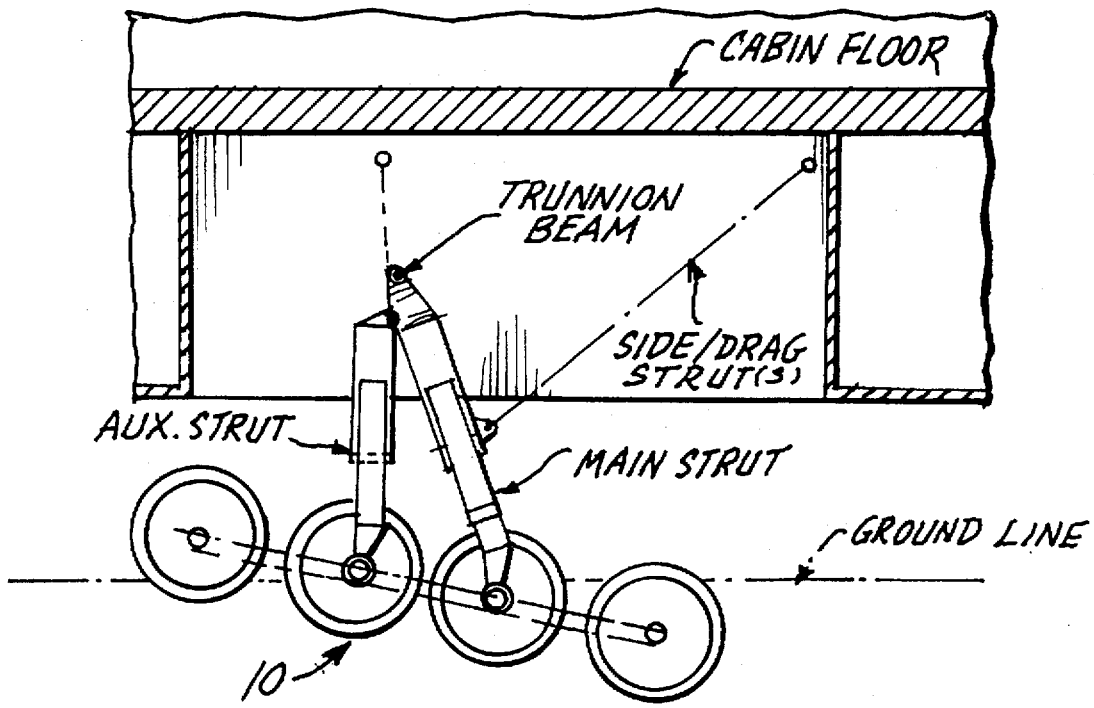
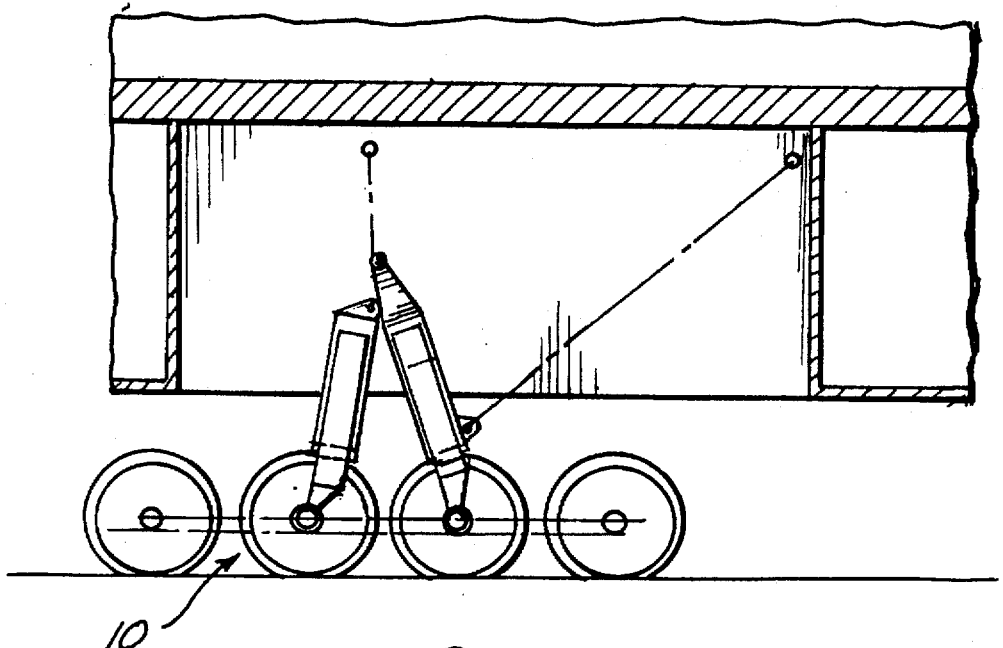
Fig. 4.

VERY LARGE AIRCRAFT LANDING GEAR HAVING EIGHT WHEEL TRUCK

BACKGROUND OF THE INVENTION

Problem: In very large aircraft applications, conventional four wheel per post (shock strut) installations require greater stowage volume and may be heavier than desirable due to the fact that a greater number of posts are needed together with their supporting structure. Conversely, for a given number of tires, if fewer posts are used, the individual shock strut sizes (diameter and length) must be increased because of higher loads per post and hence require a wider wheel base and usually a longer than desirable wheel well.

Attempts to develop an eight wheel bogie stem from development of a six-wheel bogie (see FIG. 1) with one shock strut mounted on the center axle pivot. However, an eight wheel bogie geometry with a single shock absorber does not permit convenient mounting of the shock strut on one of the axles and requires a separate pivot. Studies indicate that a separate pivot results in a weight penalty. Furthermore, evaluation of a single shock strut on eight wheels for application to large aircraft results in a very large shock absorber which current technology may find difficult to build. And finally, the physical size of this arrangement results in poor kinematic retraction which requires the same if not more stowage volume than the separate four wheel installations which it is supposed to replace. Attempts to reduce the shock strut size and take advantage of the weight saving pivot/axle feature by using twin shock struts failed because the struts were fixed rigid to each other and the resulting kinematic action prevented a simple means of incorporating truck pitch attitude control done by a separate external actuator/damper as shown in FIG. 1.

SUMMARY OF THE INVENTION

A very large aircraft landing gear utilizing an eight wheel truck. A primary two-stage shock absorber and an auxiliary single-stage shock absorber eliminating the need for torque links as seen in the landing gear of FIG. 1.

It is accordingly an object of this invention to provide landing gear for large aircraft which permits desired truck beam pitch attitude and "soft" damping loads at the initial contact of tires to ground during landing.

It is a further object of this invention to replace two separately mounted (on the aircraft) four wheel bogie shock struts with a single mounted, eight wheel bogie on dual shock absorbers.

BRIEF DESCRIPTION OF THE DRAWING

The foregoing objects and many of the attendant advantages of this invention will become more readily appreciated as the same becomes better understood by reference to the following detailed description when taken in conjunction with the accompanying drawings wherein:

FIG. 3 is illustrative of the eight wheel truck assembly of FIG. 2 in fully extended position;

FIG. 4 is illustrative of the eight wheel truck assembly of FIG. 2 at static ground line position.

DESCRIPTION OF THE PREFERRED EMBODIMENT

Figure 1:
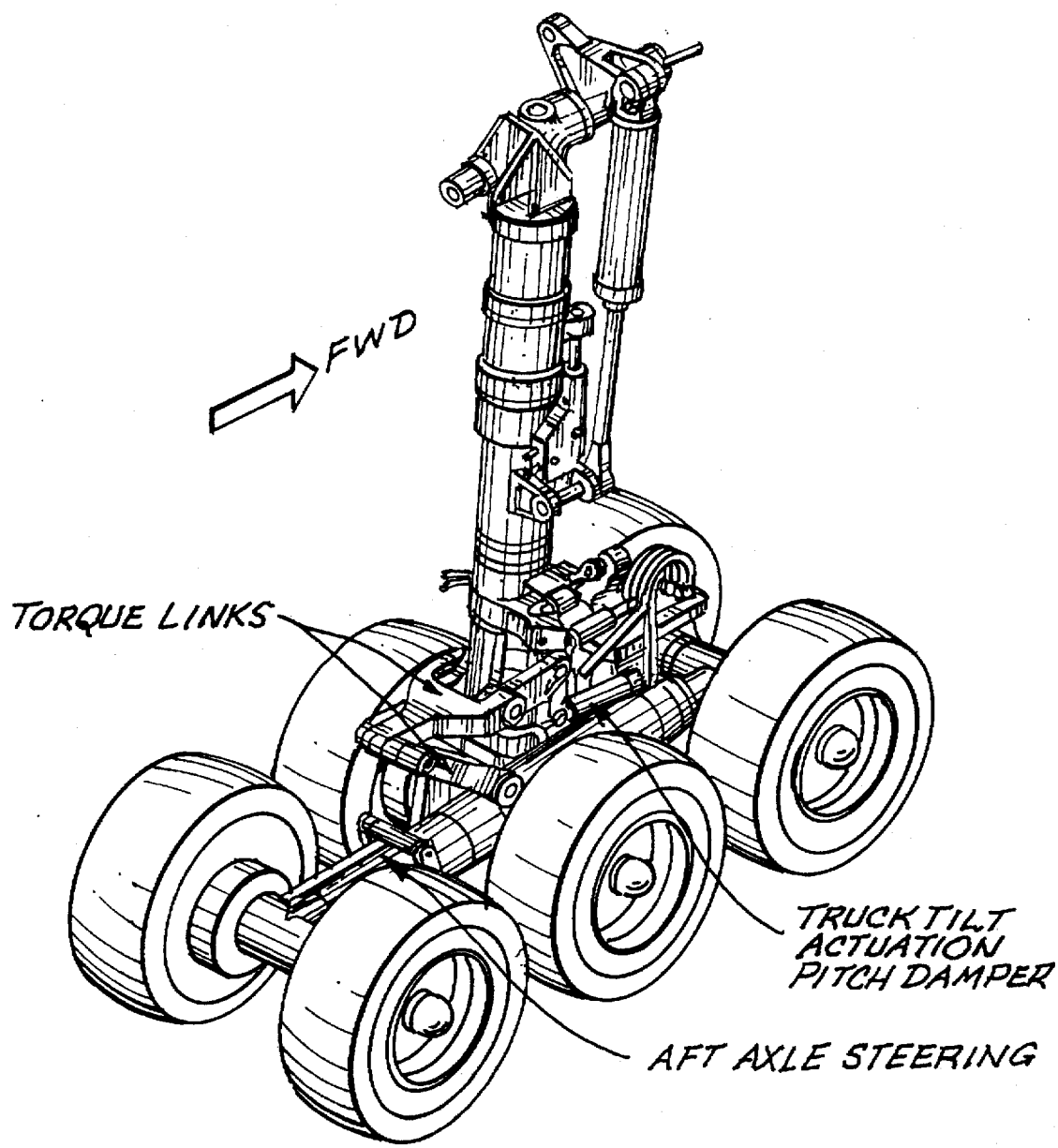
FIG. 1 is an isometric view illustrative of a six wheel truck assembly.
Figure 2:
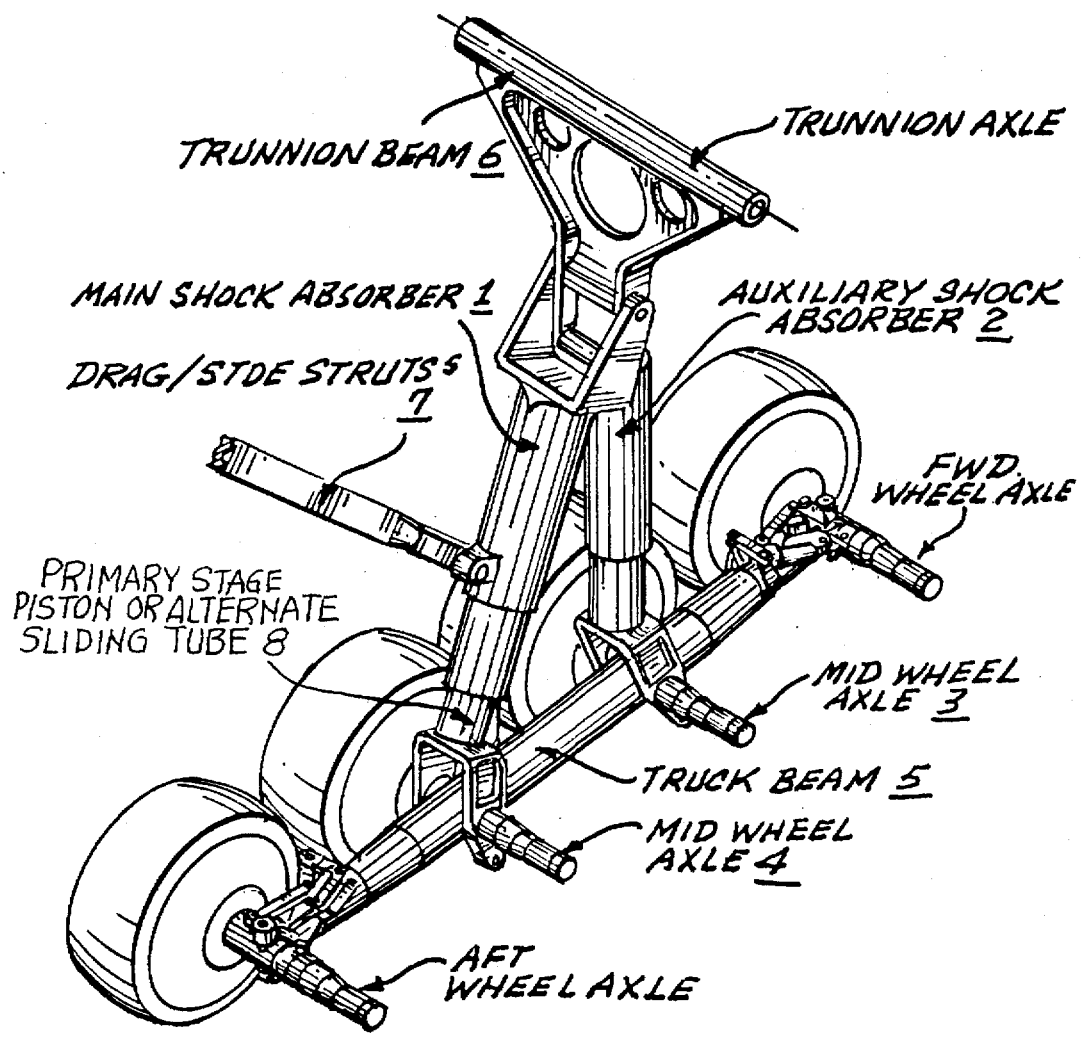
FIG. 2 is an isometric view illustrative of an eight wheel truck assembly having steerable forward and aft axles in accordance with a preferred embodiment of the present invention.
Figure 5:
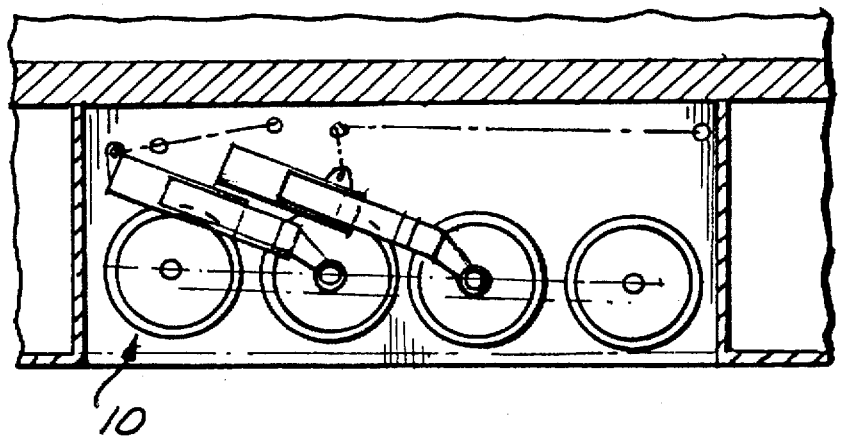
FIG. 5 is illustrative of the eight wheel truck assembly of FIG. 2 with eight wheel truck at fully retracted position.

Turning now first to FIG. 2, it will be seen that the present eight wheel truck assembly 10 having steerable forward and aft axles comprises dual shock struts, a primary or main, two-stage shock absorber 1 and a semi-articulating secondary or auxiliary, single-stage shock absorber 2, each of which are mounted using the second 3 and third 4 axles as pivot joints in a four axle, eight wheel truck beam 5. The two shock struts are attached to the aircraft through a rotating trunnion beam 6 at their upper ends and through suitable drag and/or side strut connection(s) 7 at the lower ends of their outer cylinders. Rotating trunnion beam 6 is not required to be fixed as shown but may be adjusted depending on the type of aircraft installation and the desired retraction path (as mentioned hereinabove for the side and drag strut locations). For example a complete re-alignment of 90° to the fore and aft direction is possible for use in a wing gear installation. Then the trunnion to shock strut axles would also need similar re-alignment and possibly gimballing in the case of the auxiliary strut due to the nature of its motion. It should be noted that optimal side and drag strut locations are dependent on the type of aircraft installation. Also, the arrangement shown eliminates the need for torque links (as in FIG. 1) resulting in additional potential weight saving. The use of a two-stage main shock absorber 1 is vital to this invention in that it permits the desired truck beam 5 pitch attitude and "soft" damping loads at the initial contact of tires to ground during landing. This is deemed to be important as increased truck sizes may cause adverse reaction loads during the wheel spin-up phase of landing for example. Furthermore, the dual shock struts are believed to act as inherent truck pitch dampers to minimize the pitching motion of the truck beam following initial ground contact.

An alternative to the two-stage shock absorber feature of the present eight wheel landing gear which is less weight/ cost effective consists of replacement of the first of primary stage shock absorber 1 with a sliding tube 8 and effectuating truck tilt and pitch damping using hydraulics as in the system of FIG. 1.

What is claimed is:

1. An eight wheel truck assembly comprising a four axle eight wheel truck beam, said eight wheel track assembly further comprising:

a primary two-stage shock absorber; and, a semi-articulating secondary single stage shock absorber;

said primary two-stage shock absorber and said semi-articulating secondary single stage shock absorber mounted utilizing the second and third axles of said four axle eight wheel truck beam as a pivot joint.

* * * * *